May 14, 1968  F. PAPKE  3,382,755
RANGEFINDER FOR PHOTOGRAPHIC PURPOSES INCLUDING
A DEFORMABLE PRISM
Filed Feb. 18, 1964  2 Sheets-Sheet 1

May 14, 1968 F. PAPKE 3,382,755
RANGEFINDER FOR PHOTOGRAPHIC PURPOSES INCLUDING
A DEFORMABLE PRISM
Filed Feb. 18, 1964 2 Sheets-Sheet 2

United States Patent Office 3,382,755
Patented May 14, 1968

1

3,382,755
RANGEFINDER FOR PHOTOGRAPHIC PURPOSES INCLUDING A DEFORMABLE PRISM
Friedrich Papke, Braunschweig, Germany, assignor to Voigtlander A.G., Braunschweig, Germany, a corporation of Germany
Filed Feb. 18, 1964, Ser. No. 345,659
Claims priority, application Germany, Feb. 20, 1963, V 23,674
9 Claims. (Cl. 88—2.4)

ABSTRACT OF THE DISCLOSURE

A rangefinder particularly for photographic structures. The rangefinder includes a solid, transparent, block-shaped deformable means and a directing means for directing range finger rays along a predetermined path through the transparent deformable means to the eye of the operator. A deforming means engages the transparent deformable means for deforming the latter so as to deflect the rangefinder rays and thus adjust the location of the path thereof to the eye of the operator.

---

The present invention relates to rangefinders.

The present invention relates particularly to rangefinders which are adapted to be used in cameras or the like and which are combined with viewfinders. The invention is particularly applicable to that type of rangefinder which directs rangefinder rays along a path which extends first in the same general direction as the optical axis of the viewfinder, then in a direction normal to the optical axis of the viewfinder, and finally along the optical axis to the eye of the operator. Rangefinders of this type adjust the path of the rangefinder rays until the image provided by the rangefinder rays coincides or is aligned with the viewfinder image, or at least a part thereof, so that in this way the operator knows when proper adjustment of the rangefinder and thus proper adjustment of the objective of the camera, for example, has been achieved. Rangefinders of this type conventionally include relatively rigid movable elements which provide the necessary adjustment. Such movable elements can take the form of turnable reflectors, turnable prisms or lenses, rotary transparent wedge members, or the like.

With conventional structures of the above type it is of course necessary to provide an optical element, whether it be a prism, lens, reflector, or the like, with a structure which mounts it so that it is capable of carrying out the movement which will result in the adjustment of the rangefinder so as to adjust the path along which the rangefinder rays extend.

It is a primary object of the present invention to provide a rangefinder structure which is considerably simpler than the above conventional structures.

Another object of the present invention is to provide a rangefinder assembly which is capable of adjusting the path of the rangefinder rays with an exceedingly simple and inexpensive structure which does not require any bearings or other supports to mount the path-adjusting structure for movement relative to other optical elements.

In fact, the objects of the present invention include providing a rangefinder assembly wherein the adjustment of the path of the rangefinder rays is carried out by a simple element which remains rigidly connected with other elements of the rangefinder assembly.

Also, it is an object of the present invention to provide a rangefinder assembly of the above type which is easily adapted for use with cameras of all types.

Furthermore, it is an object of the present invention to provide a rangefinder structure which can be combined with different types of viewfinder assemblies.

It is also among the objects of the present invention to provide a rangefinder structure in which the moving rangefinder elements can themselves be readily adjusted so as to guarantee the accuracy of the rangefinder.

According to a primary feature of the invention, the deflection of rangefinder rays for adjustment of the path of the rangefinder rays is brought about by an element which, instead of being moved as in conventional structures, is simply deformed for the purpose of deflecting and thus adjusting the path of the rangefinder rays.

The invention is illustrated by way of example in the accompanying drawings which form part of this application, and in which:

FIG. 1 diagrammatically illustrates one possible embodiment of a view and rangefinder assembly according to the present invention;

Figure 1:
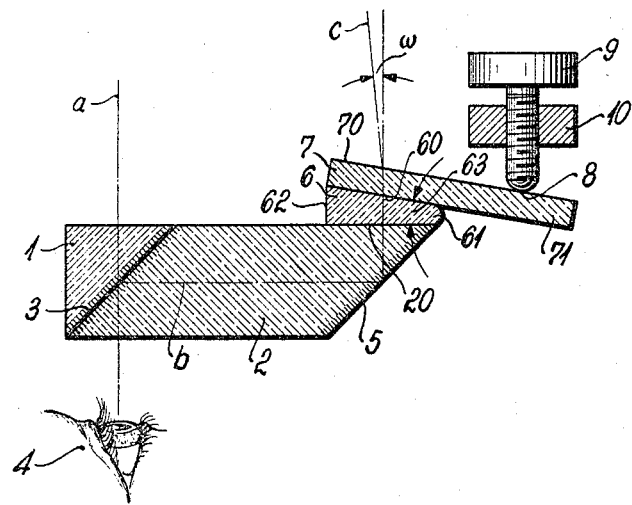

Referring now to the embodiment of the invention which is illustrated in FIG. 1, it will be seen that this embodiment includes a combined view and rangefinder assembly composed of prisms 1 and 2. The prism 1 is of triangular configuration while the prism 2 is of rhombic configuration, and these prisms are cemented together and are provided at their interface with a semi-transparent reflector 3 extending at an angle of 45° across the optical axis $a$. The reflector 3, in a well known manner, allows the observer, whose eye is indicated at 4, to view a given subject along the optical axis $a$ while at the same time viewing also an image provided by the semi-transparent reflector 3. The prism 2 has distant from the semi-transparent reflector 3 an end surface 5 which forms a second reflector parallel to the semi-transparent reflector 3 and reflecting an image toward the reflector 3 (to be reflected thereby to the eye of the observer) either by total reflection or by providing the prism 2 with a mirrored surface at its end face 5 distant from the optical axis $a$.

The prism 2 forms a directing means for directing rangefinder rays to the eye 4 of the operator, and the directing means 2 directs the rangefinder rays along a path $c$, $b$ which includes the portion $c$ extending in the same general direction as the optical axis $a$ to the reflector 5 and which then extends along the portion $b$ from the reflector 5 to the semi-transparent reflector 3 perpendicularly to and intersecting the optical axis $a$. The prism 2 forms a substantially rigid transparent body which has a surface portion 20 extending across the path $c$, $b$ of the rangefinder rays, and in accordance with the present invention there is fixed to this surface portion 20 a solid, transparent, block-shaped, deformable means 6 which is in the illustrated example is in the form of a prismatic body or block made of an elastic transparent plastic material so that the transparent deformable means 6 is resiliently deformable. This deformable means 6 may be made of many different plastic materials which are readily available in transparent form and which are resilient while at the same time being readily deformable, such plastics, including, for example, polyethylene, polyvinylchloride, polystyrene, etc.

When the structure shown in FIG. 1 is used with a subject located at infinity, the rangefinder rays will extend along a path which includes the portion $b$ perpendicular to the optical axis and the portion $c$ which in this case extends parallel to the optical axis as indicated by the solid line in FIG. 1. When sighting upon a subject located closer to the range and viewfinder assembly, it is necessary to adjust the path of the rangefinder rays so that the portion c of this path, which extends in the general direction of the optical axis a, is turned toward the optical axis, for example through the angle ω, as indicated in FIG. 1 where the path c has been shifted from the solid line location to the dot-dash line location, and thus during the operation of the range finder it is necessary to be able to adjust the path of the range finder rays in this manner. This result is achieved with the structure of FIG. 1 by adjusting the refraction angle 63 of the transparent deformable means 6. Inasmuch as the deformable means 6, particularly where it takes the form of a transparent plastic material which is easily deformable, will, during deformation, not remain flat or planar at its surface 60 which is opposed to the face thereof which is joined the surface portion 20 of the body 2, the accuracy of the rangefinder will be undesirably reduced if steps are not taken to maintain the face 60 of the deformable means 6 flat. For this reason this face 60 is, in accordance with the invention, fixed with a substantially rigid transparent elongated flat plate 7 made of glass or plastic and forming a deforming means for deforming the deformable means 6, as will be apparent from the description which follows. Inasmuch as the elongated lever or plate 7 is transparent the rangefinder rays will pass through this deforming means 7 as well as through the deformable means 6. The deforming means 7 is fixed directly to the surface 60 as by being cemented thereto with a transparent cement, and in the same way the deformable means 6 is fixed to the surface 20 of the prism 2. The accurate adjustment of the rangefinder, so as to adjust the refraction angle 63 and thus the angle of displacement of the rangefinder ray path from the path thereof when sighting a subject at infinity, is brought about by turning the deforming means 7.

Instead of cementing the elements 2, 6 and 7 to each other, they can be joined to each other in other suitable ways as by being cast together in a suitable mold so that with such a construction the elastic deformable plastic body 6 can be fixed to the substantially rigid bodies 2 and 7 in the space between the latter without any additional layers of transparent cement situated between the substantially rigid bodies 2 and 7 and the deformable transparent body 6 therebetween.

The deforming means 7 extends laterally beyond the deformable means 6 so that it has an end portion 71 distant therefrom, and this portion 71 serves as a part of the deforming means 7 which enables the latter to act as a lever which responds to the operation of an adjusting means 9 which engages the portion 71 of the deforming means 7 at the free convexly curved end of the adjusting means 9. This adjusting means 9 may take the form of an adjusting screw threadedly carried by a stationary element 10 of the camera. The adjusting means is illustrated only schematically in FIG. 1 and can take many other forms well known in the art such as, for example, cams, levers, or other motion transmitting devices which may, as is well known, respond to adjustment of the objective. As is apparent from FIG. 1, between the pair of substantially rigid bodies 2 and 7 the deformable body 6 has exposed surface portions 61 and 62 which are free to expand or contract in the space between the bodies 2 and 7 so that the elastic deformable means 6 is capable of yielding at its exposed surface portions 61 and 62 during movement of the deforming means 7 by the adjusting means 9 in order to deform the deformable means 6 for the purpose of adjusting the path of the rangefinder rays.

Figure 2:
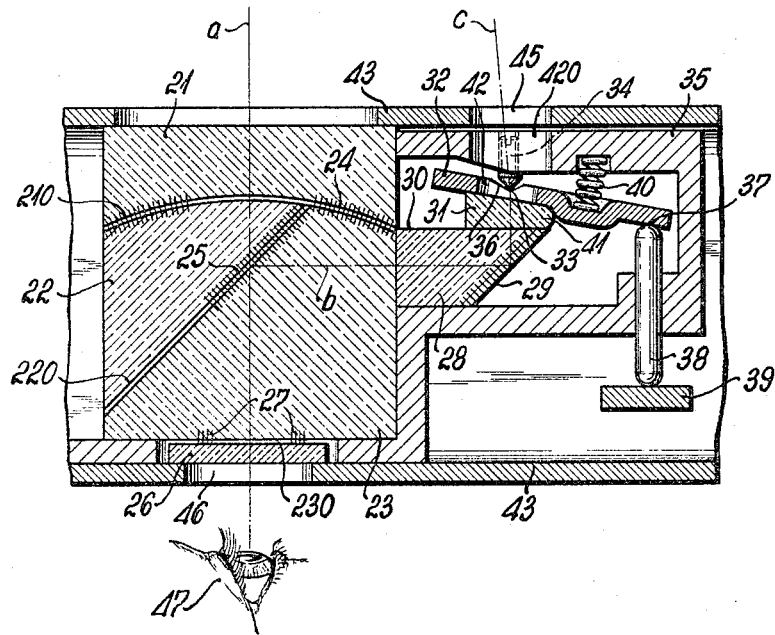
FIG. 2 illustrates in a sectional plan view another embodiment of a rangefinder assembly, combined with an Albada viewfinder.

In the embodiment of the invention which is illustrated in FIG. 2 the rangefinder is combined with another type of viewfinder capable of being used in photographic cameras. In this example, the viewfinder is in the form of a well known Albada viewfinder, and the distance between the pair of parallel reflectors, namely the semi-transparent reflector 25 and the total reflector 29, is occupied by part of the Albada viewfinder assembly as well as by an additional prism 28 which is joined to the viewfinder assembly. The prisms of the structure of FIG. 1 may be made entirely of glass. Thus, the glass prism 28 may be cemented, with a transparent cement, to the prismatic body 23 of the viewfinder, this body 23 also being made of glass.

The viewfinder of FIG. 2 includes a plano-concave front member 21 which is cemented with a transparent cement to the viewfinder blocks or prisms 22 and 23. The curve surface 210 of the Albada finder, this surface forming part of a sphere as is typical of such finders, carries the semi-transparent reflector 24 which also forms part of a sphere, and at the flat interface 220 of the prisms 22 and 23, which are cemented to each other by a transparent cement, there is a semi-transparent reflector 25 extending across the optical axis a, as indicated diagrammatically in FIG. 2. The semi-transparent reflector 25 is of course situated at an angle of 45° across the optical axis of the viewfinder, and in order to provide a bright viewfinder image the hollow reflector 24 is formed with a central cutout through which the optical axis passes so that in the region of the optical axis there is no hollow reflector material.

The frame 27, which is to be seen in the field of the viewfinder, is located at a plate 26 adjacent to the eye 47 of the operator, and this frame 27 may be mounted on a surface of the plate 26 by a well known vapor-deposition process. The transparent plate 26 is cemented with a transparent cement to the prism 23 at the interface 230 between these elements so that they are rigidly fixed to each other. In the illustrated example the frame 27 is at the interface 230 so that at this location it is protected reliably against mechanical and atmospheric influences. It is possible, however, to locate the frame at the side of the plate 26 which is directed toward the eye 47, or the plate 26 can simply be eliminated so that the frame 27 will then be located on the surface of the prism 23 which is directed toward the eye 47. Furthermore, instead of a plate 26 it is possible to use a plano-convex member which is mounted in a recess of mating curvature formed in the block 23, and of course such a member can also be cemented to the block 23 in this recess thereof by transparent cement. With such a construction the frame 27 would also be located at the interface between the plano-convex element and the block 23 where these elements are cemented to each other. Construction differences of this type have no material influence on the present invention.

Laterally of the viewfinder body 23 is located the above-mentioned prism 28 which is fixedly cemented to the right face of the body 23, as viewed in FIG. 2, by a suitable transparent cement, and at its end which is distant from the block 23 the prism 28 has a fully reflecting surface 29 forming a second reflector which is parallel to the semi-transparent reflector 25. The surface 30 of the prism 28 has fixedly joined thereto, again with a suitable transparent cement, the transparent deformable means 31 which may be made of the same material as the deformable means 6 described above. It will be noted that in FIG. 2 the patch c, b includes the portion b perpendicular to the optical axis and extending through the joined blocks 23 and 28, while the portion c of the path of course extends in the same general direction as the optical axis a. The prismatic deformable transparent body 31 has, of course, opposed faces one of which is fixed to the surface 30 as described above and the other of which is fixed to an elongated deforming means formed by the plate 32 which may also be fixed to the deformable means 31 with a suitable transparent cement. This deforming means 32 will of course maintain the surface of element 31 to which it is fixed in a perfectly flat condition. The deforming means 32 need not be entirely transparent. It can be opaque and simply formed with a window 42 which provides the deforming means 32 with a transparent portion at the part thereof through which the rangefinder rays pass, and this window 42 is in the form of a rigid transparent element mounted in a suitable opening of the lever 32 and having in engagement with the deformable element 31 a surface which is flush with the lower surface of element 32, as viewed in FIG. 2.

In the example illustrated in FIG. 2, the deforming means 32 is guided for turning movement about an axis 33 which is normal to the path c along which the rangefinder rays extend. The turning axis 33 is determined by the engagement of the tips of the pointed ends of a pair of screws 34 with the lever or plate 32, and by adjusting the screws 34 it is possible to adjust the location of the turning axis 33 of the deforming means 32, so that in this way the accuracy of the rangefinder structure can be maintained. The rangefinder structure is located within a housing 35 which is formed at its front wall with threaded openings which receive the adjusting screws and through which the latter are accessible for adjusting the location of the turning axis 33. The pointed tips of the adjusting screws extend into small depressions or recesses 36 formed in the plate 32 on opposite sides of the window 42, and by adjustment of these screws it is possible to deform the elastic deformable means 31 within small limits in such a way that any height errors of the system are compensated for.

Figure 3:
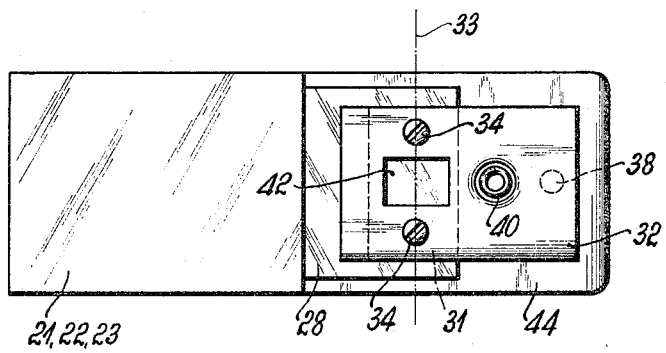
FIG. 3 is a top plan view of the structure of FIG. 2 with the upper wall of FIG. 2 removed so as to illustrate more clearly the structure behind this wall.

Only one of the adjusting screws is visible in FIG. 2. However, both of the adjusting screws are visible in FIG. 3. The cap or hollow cover which is mounted on top of the camera housing, to form a compartment for structure such as the range and viewfinder assembly of the invention, is removed from the structure shown in FIG. 3 so that the details of the structure can be clearly illustrated.

An adjusting means cooperates with the deforming means 32 for moving the latter to adjust the extent of deformation of the deformable means 31 so as to adjust, in the manner described above in connection with FIG. 1, the path c, b of the rangefinder rays, and in the example illustrated in FIG. 2 this adjusting means takes the form of an elongated rod 38 guided for longitudinal sliding movement in a bore of a wall of the housing 35 and having a convexly curved end 37 engaging one face of the deforming lever 32. The opposite end of the adjusting rod or pin 38 is engaged by a motion transmitting element 39 which in a known way is connected with the objective to transmit adjustment of the objective to the rod 38 and then through the deforming means 32 to the deformable means 31 so as to adjust the rangefinder ray path. A face of the deforming means 32 which is directed away from the adjusting means 38 is engaged by compression spring 40 which extends into a recess of this latter face as well as into a recess formed at the inner surface of the front wall of the housing 35, and thus the spring 40 forms a spring means which urges the deforming means 32 into engagement with the adjusting means 38.

When movement of the objective is transmitted to the pin 38 by the element 39, the deforming means 32 will turn about the axis 33, so that the deformable prismatic body 31 will be deformed and thus the angle of the portion c of the rangefinder ray path will be changed. The material of the deformable means 31 is free to yield at such places as the exposed surface 41 thereof located between the relatively rigid bodies 28 and 32, which are of course spaced from each other and which are fixed at their surfaces which are directed toward each other respectively to opposite faces of the deformable means 31.

The front wall 35 of the housing 35 is formed with an opening 420 aligned with the deformable means 31 so that the rangefinder rays pass freely through the opening or window 420, and the cap, at the upper portion of the camera, which houses the range and viewfinder structure is formed at its front wall with a window or opening 45 which is aligned with the window or opening 420, so that in this way the portion c of the rangefinder ray path can pass freely through the cap 43 and the housing 35 to the structure of the invention. The cap 43 is fixed to the upper wall 44 of the samera housing, this upper wall 44 being visible in FIG. 3, and the rear wall of the cap 43 is formed with an opening 46 through which the optical axis a passes. Thus, the eye 47 will observe the subject through the viewfinder along the optical axis a while a rangefinder image of the subject will be directed along the path c, b to the optical axis to be reflected by the semi-transparent reflector 25 to the eye 47.

Figure 4:
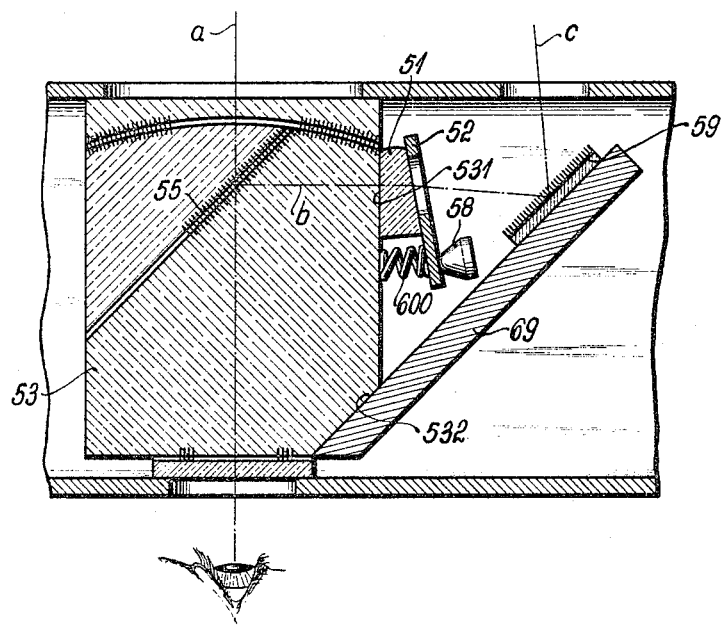
FIG. 4 is a sectional schematic plan view illustrating yet another possible embodiment of a range and viewfinder assembly according to the present invention.

In the embodiment of the invention which is illustrated in FIG. 4 the path c, b of the rangefinder rays passes at its portion b only partly through the glass or plastic of the viewfinder, while the rest of this path of the rangefinder rays extends only through a free space. In this case the deformable means 51 through which the path c, b passes is fixed by suitable transparent cement on the surface 531 of the prism 53 of the viewfinder between the surface 531 and the reflector 59, the viewfinder including a semi-transparent reflector 55 parallel to the reflector 59 and directing the rangefinder rays along the optical axis a to the eye of the observer through the block 53 through which part of the path b extends, as indicated in FIG. 4. Thus, the side surface of the block 53 forms a support for the deformable means 51. The viewfinder of FIG. 4 is of the same type as shown in FIG. 2 and described above, so that it is unnecessary to enter into a detailed description of the viewfinder shown in FIG. 4. As is apparent from FIG. 4, the difference between the embodiment of FIG. 4 and that of FIG. 2 is that in the case of FIG. 4 the reflector 59, of the directing means for directing the rangefinder rays from the subject to the eye of the operator, is carried by the free end of an elongated rigid supporting arm 69 which is fixed to the surface 532 of the block 53 as by being cemented thereto, and the supporting arm 69 for the reflector 59 extends in an inclined direction from the viewfinder block 53, in the manner indicated in FIG. 4. In other words, the arm 69 is inclined forwardly and to the right from the right rear portion of the block 53, as is apparent from FIG. 4.

The deformable means 51, which is transparent, of course has one of its faces fixedly cemented to the block 53 at the surface 531 thereof, and the opposed face of the deformable means 51 is fixedly cemented to the deforming means 52 in the form of a substantially rigid plate which may be opaque except for a portion thereof which forms a window receiving a rigid transparent element flush with surface of the deforming means 52 which engages the deformable means 51 and through which the rangefinder rays pass, as indicated in FIG. 4. A spring 600 is situated between the block 53 and the deforming means 52 for urging the latter to a rest position where the portion c of the rangefinder path extends inclined to the optical axis a, this position corresponding of course to the sighting of a subject which is located at a near distance from the camera and when sighting subjects which are located at a larger distance from the camera a motion transmitting element 58, which is actuated in a known way from the objective, acts on the deforming means 52 in order to turn the latter so as to deform the deformable means 51 and, by changing the refraction angle thereof, adjust the path of the rangefinder rays to an inclination which is adapted for a subject which is at a larger distance from the camera. As is apparent from FIGS. 1, 2 and 4, the structures of all these embodiments are illustrated in the positions they take when sighted upon subjects at less than infinity from the camera.

With the embodiments according to FIG. 1 and FIG. 4, the ray entrance surfaces and the ray exit surfaces of the deformable prism are parallel to each other in infinity position. If the prism 6 in FIG. 1 is deformed from its infinity position towards a position of closer distance, the side 62 begins to straighten, while the side 61 correspondingly is pressed and thus vaulted out. The prism 51 in FIG. 4 reaches its infinity position when the motion transmitting element 58 has swung the plate 52, illustrated in its close distance position, against the tension of the spring 600 thus far, that the plate 52 is parallel to the usrface 531 of the viewfinder block 53.

While specific embodiments of the invention have been shown and described in detail to illustrate the application of the principles of the invention, it will be understood that the invention may be embodied otherwise without departing from such principles.

What is claimed is:

1. In a rangefinder, particularly for photographic apparatus, solid, transparent, block-shaped deformable means having two substantially planar angularly related surfaces; directing means for directing range finder rays along a predetermined path through said transparent deformable means to the eye of the operator; and deforming means engaging said transparent deformable means to change the angular relationship between said planar surfaces of said deformable means for deforming the latter to deflect said rays and thus adjust said path.

2. In a rangefinder, solid, transparent deformable means of prismatic configuration having two substantially planar angularly related surfaces; directing means for directing rangefinder rays along a path extending through said deformable means to the eye of the operator; and deforming means operatively engaging said deformable means to change the angular relationship between said planar surfaces of said deformable means for deforming the latter to deflect said rays and thus adjust said path.

3. In a structure, such as a rangefinder, for changing the path along which light rays extend, a pair of substantially rigid transparent bodies having substantially planar surfaces spaced from and directed toward each other and extending across the path along which the light rays extend; solid, transparent, block-shaped, deformable means having two substantially planar angularly related surfaces located between and engaging said surfaces of said bodies; and means for moving one of said bodies relative to the other for deforming said transparent deformable means to change the angular relationship between said planar surfaces of said deformable means and thus deflecting said light rays to change the path along which the light rays extend.

4. For use in a device, such as a rangefinder, for adjusting the path along which light rays extend, a pair of substantially rigid transparent bodies having substantially planar surfaces spaced from and directed toward each other and extending across a path along which light rays extend; solid transparent, block-shaped, deformable means having two substantially planar angularly related surfaces located between and engaging said surfaces of said bodies and having an exposed surface portion extending between said surfaces in the direction substantially the same as the path along which the light rays extend; and moving means operatively engaging at least one of said bodies for moving the latter relative to the other of said bodies for deforming said deformable means to change the angular relationship between said planar surfaces of said deformable means to deflect said light rays and thus adjust the path along which the light rays extend, said deformable means yielding at said exposed surface portion thereof during movement of said one body to deform said deformable means.

5. A combined range- and viewfinder assembly comprising viewfinder means having an optical axis; a semi-transparent reflector extending across said optical axis; directing means including a second reflector parallel to and spaced from said semi-transparent reflector for directing rangefinder rays along a path which extends generally in the same direction as said optical axis to said second reflector and then from said second reflector perpendicularly to said optical axis to said semi-transparent reflector to be reflected thereby to the eye of the operator, said directing means including a substantially rigid transparent body located between said reflectors and having a substantially planar surface portion extending across said path; solid, transparent, block-shaped, deformable means having two substantially planar angularly related surfaces fixed to said surface portion of said body; and deforming means engaging said deformable means to deform the latter to change the angular relationship between said planar surfaces of said deformable means for deflecting said rangefinder rays and thus adjusting said path.

6. For use in a rangefinder, directing means for directing rangefinder rays along a path extending from a given subject to the eye of the operator, said directing means having a substantially planar surface portion extending across said path; solid transparent, block-shaped, deformable means having two substantially planar angularly related surfaces fixed to said surface portion so that said path extends through said transparent deformable means; elongated substantially rigid deforming means fixed to a surface of said deformable means which is directed away from said surface portion of said directing means and extending beyond said deformable means, said deforming means being transparent at least at a part thereof which is fixed to said deformable means so that said range finder rays also pass through said deforming means; and adjusting means engaging a portion of said deforming means which is located beyond said deformable means for moving said deforming means to deform said deformable means to change the angular relationship between said planar surfaces of said deformable means and thus deflect said rangefinder rays to adjust said path of said rangefinder rays.

7. For use in a rangefinder, solid transparent, block-shaped deformable means having a pair of opposed substantially angular related planar faces; directing means fixed to one of said faces for directing rangefinder rays along a path extending through said deformable means to the eye of the operator; elongated substantially rigid deforming means fixed to the other of said faces of said deformable means and having a transparent portion at least at a part of said deforming means which is fixed to said deformable means so that said path extends through said transparent portion of said deforming means; adjusting means engaging said deforming means at a part thereof located beyond said deformable means for moving said deforming means so as to deform said deformable means to change the angular relationship between said planar faces of said deformable means and deflect said rays to adjust said path; and guide means operatively engaging said deforming means to guide the latter for turning movement, in response to adjustment of said deforming means by said adjusting means, about an axis which is normal to said path.

8. For use in a rangefinder, solid transparent, block-shaped deformable means having a pair of opposed substantially planar angularly related faces; directing means fixed to one of said faces for directing rangefinder rays along a path extending through said deformable means to the eye of the operator; an elongated deforming lever fixed to the other of said faces of said deformable means and having a transparent portion located at a part of said lever which engages said deformable means; guide means guiding said lever for turning movement about an axis normal to said path; adjusting means engaging said lever at one face thereof at a part of said lever distant from said deformable means, said adjusting means turning said lever about said axis to deform said deformable means to change the angular relationship between said planar surfaces of said deformable means for deflecting said rays and thus adjust said path; and spring means engaging a face of said lever, opposed to that which is engaged by said adjusting means, for maintaining said lever in engagement with said adjusting means.

9. In a rangefinder having two sighting paths and means for combining said two paths, the improvements comprising a solid transparent deformable block shaped member having two substantial planar angular related surfaces through which one said paths passes, and relatively adjustable means engaging said planar surfaces of said transparent deformable means for changing the angular relationship between said planar surfaces to deviate one of said sighting paths.

References Cited

UNITED STATES PATENTS

| | | | |
|---|---|---|---|
| 757,900 | 4/1904 | Englund | 88—1 |
| 2,241,415 | 5/1941 | Moulton | 351—162 |
| 2,999,416 | 9/1961 | Mische | 88—2.4 |
| 3,016,786 | 1/1962 | Papke | 88—1.5 |
| 3,039,352 | 6/1962 | Mische | 88—1.5 |
| 3,212,420 | 10/1965 | De La Cierava | 350—285 |

JEWELL H. PEDERSEN, *Primary Examiner.*

O. B. CHEW, *Assistant Examiner.*